2,946,804
Patented July 26, 1960

2,946,804

(5-METHYL-4-IMIDAZOLYL)-DIPHENYL CARBINOL SALTS AND LOWER ALKYL QUATERNARIES

Harold E. Zaugg, Lake Forest, and Robert W. De Net, Waukegan, Ill., assignors to Abbott Laboratories, North Chicago, Ill., a corporation of Illinois No Drawing. Filed Dec. 29, 1958, Ser. No. 783,121

7 Claims. (Cl. 260—309)

This invention relates to novel derivatives of imidazole carboxylic esters, particularly, aryl carbonyl derivatives thereof.

In the practice of this invention, imidazole carboxylic esters of the following type:

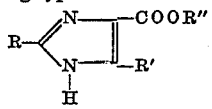

where R and R' are hydrogen or lower alkyl, such as methyl and R" is lower alkyl, such as methyl, are reacted with a phenyl Grignard reagent to form carbinol derivatives of the following type:

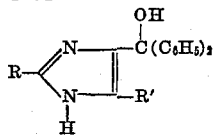

where R and R' are identified as hereinbefore.

The novel compounds of this invention are useful as potentiators for central nervous system depressing drugs, particularly, barbiturates.

It will be apparent that the novel compounds disclosed herein contain a basic tertiary nitrogen in the imidazole moiety, therefore, providing a situs for acid addition and quaternary ammonium salts. The acid addition salts may be formed with a variety of inorganic acids such as sulfuric, phosphoric, hydrochloric, hydrobromic, hydriodic, sulfamic and like acids. Strongly organic acids may also be used such as citric, lactic, maleic, malic, succinic, cinnamic, acetic, benzoic, gluconic, ascorbic, cyclohexylsulfamic and related acids.

The quaternary ammonium salts can be formed by the addition of alkyl halides such as chlorides and bromides of methyl, ethyl, propyl, isopropyl, allyl, butyl and isobutyl alkyls.

The following examples are set forth to teach the invention in operation, but it is not intended that said examples be considered as exclusive teachings thereof.

EXAMPLE I (5-methyl-4-imidazolyl)-diphenylcarbinol

A solution of approximately 54 g. (0.335 mole) of phenylmagnesium bromide in 300 ml. of ether is treated with 250 ml. of tetrahydrofuran and the ether is removed by distillation. To the hot Grignard solution is added 10 g. (0.065 mole) of powdered 4-carbethoxy-5-methyl-imidazole. The mixture is stirred and refluxed for a few minutes and then about three-fourths of the solvent is removed under reduced pressure. To the cooled mixture, ether is added, followed by excess of an aqueous ammonium chloride solution. The solid which remains undissolved is collected at the filter, the ether layer is separated and concentrated to dryness. The residual solid is combined with the original filter-cake and dissolved in excess aqueous hydrochloric acid. This solution is then made alkaline with aqueous potassium hydroxide and the liberated solid base (11.5 g., 67%, M.P. 182–184 dec.) is collected at the filter. Several recrystallizations from isopropyl alcohol give analytically pure carbinol, M.P. 186–187° dec.

*Analysis.*—Calcd. for $C_{17}H_{16}N_2O$: C, 77.24%; H, 6.10%; N, 10.60%; O, 6.06%. Found: C, 77.11%; H, 5.89%; N, 10.63%; O, 6.35%.

EXAMPLE II (5-methyl-4-imidazole)-diphenylcarbinol methiodide

Refluxing 1.5 g. of the base of Example I for 4 hours in methyl ethyl ketone with excess methyl iodide gives, after recrystallization from an isopropyl alcohol-ether mixture, 0.8 g. of the quaternary methiodide salt of (5-methyl-4-imidazole)-diphenylcarbinol, M.P. 223–224° dec. (from dry ethanol).

*Analysis.*—Calcd. for $C_{18}H_{19}IN_2O$: C, 54.29%; H, 5.04%; N, 6.67%. Found: C, 54.25%; H, 5.35%; N, 6.56%.

EXAMPLE III (4-imidazolyl)-diphenylcarbinol

In a manner similar to the procedure in Example I, addition of phenylmagnesium bromide to 4-carbomethoxyimidazole results in the production of (4-imidazolyl)-diphenylcarbinol in an 81% yield, M.P. 173–174° dec.

*Analysis.*—Calcd. for $C_{16}H_{14}N_2O$: C, 76.77%; H, 5.64%; N, 11.20%; O, 6.39%. Found: C, 76.56%; H, 5.68%; N, 10.88%; O, 6.71%.

The hydrochloride salt of the foregoing base is prepared by dissolving said base in ether and adding to such mixture a solution of excess hydrochloride in ether. The hydrochloride salt precipitates and has a molecular weight of 286.5.

EXAMPLE IV (2-methyl-4-imidazolyl)-diphenylcarbinol

By the procedure outlined in Example I, reaction of 4-carbomethoxy-2-methylimidazole with the phenyl Grignard reagent results in the production of (2-methyl-4-imidazolyl)-diphenylcarbinol in a 78% yield, M.P. 200–201° dec. (from dry ethanol).

*Analysis.*—Calcd. for $C_{17}H_{16}N_2O$: C, 77.24%; H, 6.10%; N, 10.60%; O, 6.06%. Found: C, 77.30%; H, 6.29%; N, 10.44%; O, 6.14%.

In the foregoing examples, phenylmagnesium bromide is selected as the Grignard reagent employed in the process. It will be apparent to those skilled in the art that phenylmagnesium halides other than the bromide are operable in the process.

Others may practice the invention in any of the numerous ways which will be suggested by this disclosure to one skilled in the art. All such practice of the invention is considered to be a part hereof provided it falls within the scope of the appended claims.

We claim:
1. (5-methyl-4-imidazolyl)-diphenylcarbinol.
2. 4-diphenylcarbinol-5-methylimidazole methiodide.
3. (4-imidazolyl)-diphenylcarbinol.
4. (4-imidazolyl)-diphenylcarbinol hydrochloride.
5. (2-methyl-4-imidazolyl)-diphenylcarbinol.
6. A compound selected from the class consisting of bases of the formula:

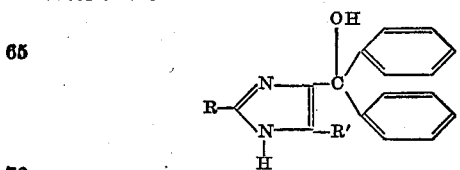

where R and R' are selected from the class consisting of hydrogen and methyl; the non-toxic acid addition salts thereof; and the non-toxic lower alkyl quaternary ammonium salts thereof.

7. A process for preparing bases of the formula:

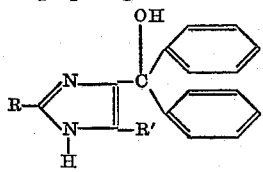

where R and R' are selected from the class consisting of hydrogen and methyl, which comprises the addition of about five moles of a phenylmagnesium Grignard reagent to about one mole of a compound of the formula:

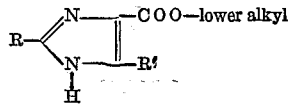

where R and R' are selected from the class consisting of hydrogen and methyl; and conducting the reaction under reflux conditions.

No references cited.